Aug. 17, 1926.

F. G. SIMPSON

SPEED AND COURSE INDICATOR FOR CONVEYANCES

Filed August 4, 1923

Inventor
Frederick Grant Simpson

By
Fred C. Matheny
Attorney

Aug. 17, 1926.  
F. G. SIMPSON  
1,596,380  
SPEED AND COURSE INDICATOR FOR CONVEYANCES  
Filed August 4, 1923    2 Sheets-Sheet 2

Inventor  
*Frederick Grant Simpson*

By *Fred C. Matheny*  
Attorney

Patented Aug. 17, 1926.

1,596,380

UNITED STATES PATENT OFFICE.

FREDERICK GRANT SIMPSON, OF SEATTLE, WASHINGTON.

SPEED AND COURSE INDICATOR FOR CONVEYANCES.

Application filed August 4, 1923. Serial No. 655,747.

This invention relates to a method of, and apparatus for, measuring the velocity, and indicating the direction of motion, of a terrestrial body relative to the surface of the earth; and, more specifically, embodies means of determining the rate at which the vertical component of the earth's magnetic field is cut by an electrical conductor which forms a part of such moving terrestrial body.

The object of the invention is to provide a simple, and easily applied, method of ascertaining the velocity and its direction relative, and parallel, to the earth's surface, of any conveyance which is capable of carrying such devices as are necessary in the exercise of this method. A more particular object of the invention is to provide means for determining the speed over the surface of the earth, and the course, of conveyances such as aircraft and watercraft. The direction in which the conveyance is headed must be determined by a compass and the drift angle, or angle at which the conveyance is actually proceeding relative to the direction in which it is headed is determined by this apparatus thus furnishing the necessary information for determining the true course.

These objects are accomplished by providing, on the conveyance, an arrangement of electrical circuits wherein electromotive forces are generated by, and are proportional to, the movement of the conveyance in any direction, in a plane substantially parallel to the earth's surface, which is to say, at an angle of ninety degrees from the direction of the vertical component of the earth's magnetic field, and by providing means for measuring such electromotive forces; all as will be understood from the following description in connection with the accompanying drawings.

Figure 1:
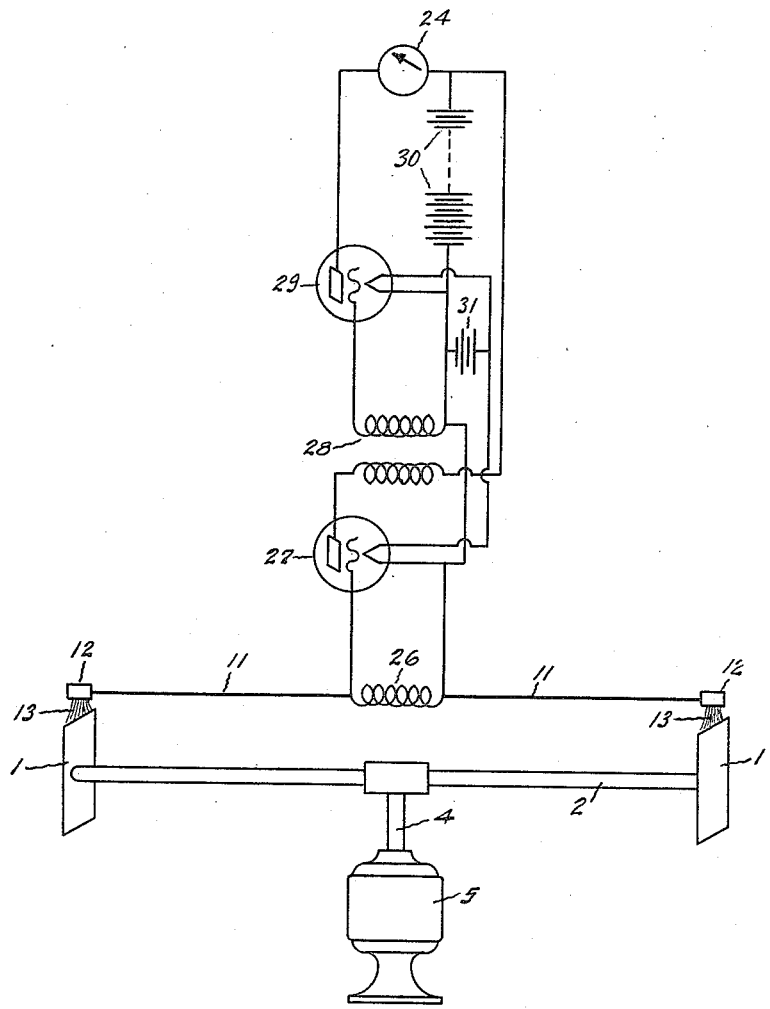
Figure 2:
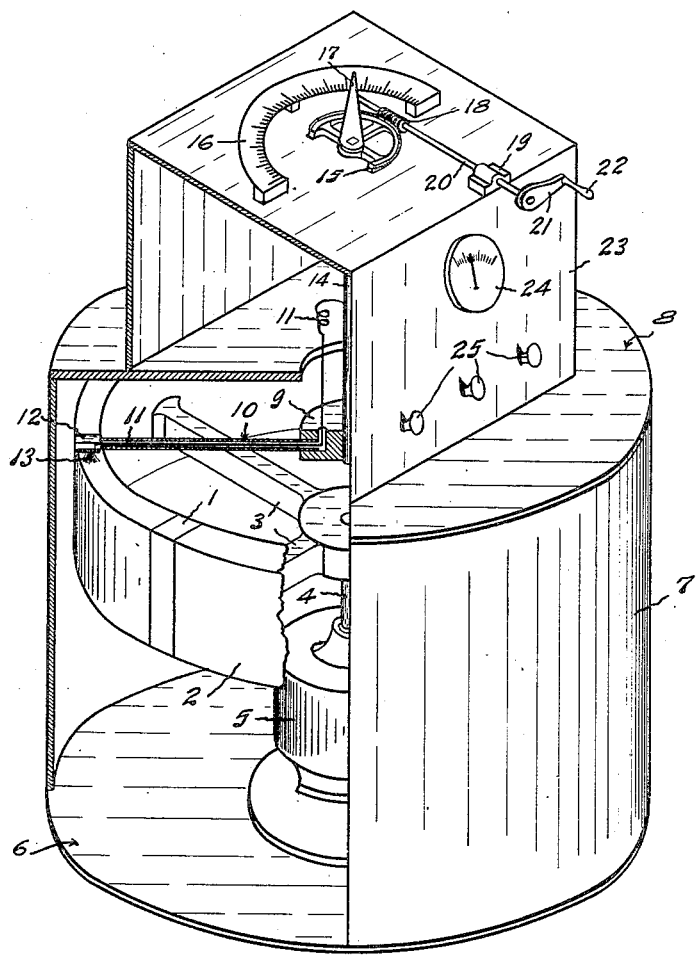

In the drawings Figure 1 illustrates, diagrammatically, a typical form of my arrangement of electrical circuits, and electrical apparatus, on a conveyance. Figure 2 shows in perspective one, of many, ways of assembling the various circuits and apparatus, on a conveyance Like reference numerals designate like parts throughout the several views.

Referring particularly to Fig. 1, the numeral 1 represents two conductor plates of an electrical condenser. The plates 1 are rigidly attached to the respective extremities of the insulating arm 2. The arm 2 with its surrounding atmosphere forms the dielectric of the condenser of which the plates 1 are the conductors. The arm 2 is attached at its middle point to the revolving shaft 4 of the electric motor 5. The numeral 11 represents two branches of an electrical conductor in the form of a wire, or rod, of small cross sectional area compared to its length. Inserted in series with the conductor 11 is the inductance coil 26. The two branches of the conductor 11 lie in the same vertical and horizontal planes. A brush holder 12 is electrically attached to each of the outer extremities of the conductor 11. A brush 13 is electrically attached to each of the brush holders 12. The distance between the brushes 13 is the length of a diameter of the circumference formed by the rotation of the condenser plates 1 about the center of the shaft 4. The relative positions of the condenser plates 1 and the brushes 13 are such as to cause each of the plates 1 to make electrical contact with each of the brushes 13 for a short time interval once during each revolution of the shaft 4. The numerals 27 and 29 represent two triode electron relay tubes. Each tube consists of an anode, a hot cathode and a grid electrode placed between the anode and the cathode, contained in an evacuated chamber in a well known manner. The cathodes of the tubes 27 and 29 are filament conductors arranged to be heated by an electric current. The terminals of the filaments, which constitute the cathodes, are electrically connected to form two common terminals, and to the terminals of the electric battery 31 which supplies the necessary current to heat the filaments. 30 is an electric battery, or other generating source of electromotive force. 24 is an electric current, or electric potential, indicating instrument. 28 is a transformer having a primary coil and a secondary coil. The negative terminal of the battery 30 is electrically connected to the negative terminal of the battery 31 and, therefore, to the cathodes of the triode tubes 27 and 29. The positive terminal of the battery 30 is electrically connected to one terminal of the primary coil of the transformer 28 the other terminal of which is electrically connected to the anode of the triode tube 27. The positive terminal of the battery 30 is also electrically connected to one terminal of the instrument 24 the other terminal of which is electrically connected to the anode of the triode tube 29. The secondary coil of the transformer 28 has one of its terminals electrically connected to the cathode of the triode tube 29 and its other terminal electrically connected to the grid electrode of the triode tube 29. One of the terminals of the coil 26 is electrically connected to the grid electrode of the triode tube 27. The other terminal of the coil 26 is electrically connected to the cathode of the triode tube 27.

The electrical arrangement of triode electron tubes in the circuits herein-before described constitutes a two stage amplifier, of a well known kind, which functions in a manner to greatly amplify electrical potential differences impressed between the grid electrode and the cathode of the triode tube 27, as evidenced by similar, but amplified, potential differences between the terminals of the instrument 24.

The arrangement of electrical circuits and apparatus hereinbefore described in connection with Fig. 1, is such that the condenser plates 1 are conductively joined together, by means of the brushes 13, the brush holders 12, the inductance coil 26 and the conductor 11, twice during each revolution of the shaft 4. The time intervals during which the plates 1 are not conductively joined are of equal duration, it being assumed that the speed of rotation of the motor 5 is constant.

In Fig. 2 the insulating, or dielectric, arm 2 is in the form of a ring supported by the motor shaft 4 by means of the insulating spider 3. The conductor 11 is enclosed by the insulating tube 10. A housing, consisting of the cylindrical wall 7, bottom 6 and top 8, encloses the rotating condenser having plates 1 (one only of which is in view in the figure), driving motor 5 and the conductor 11. An electron tube amplifier is contained in the housing 23. The numeral 25 represents the controlling switches for the amplifier circuits. The conductor 11, with its supporting tube 10, may be rotated through an angle of one hundred and eighty degrees, in a plane parallel to the plane of rotation of the condenser plates 1, by means of the shaft 14, which is rigidly attached to the insulator block 9, to which the common central point of the conductor 11 and insulating tube 10, is also rigidly attached. The shaft 14 is driven by the gear 15, to which it is attached, and which carries the pointer 17. A worm 18, which engages the gear 15, is supported by bearings 19 and is driven through shaft 20 by means of crank 21 and handle 22. The pointer 17 is rigidly attached to the gear 15, and therefore to the shaft 14, with its longitudinal dimension at an angle of ninety degrees from, and in a plane parallel to that of the conductor 11.

The position of the pointer 17 relative to the housing 23, and therefore to the conveyance upon which the entire device is mounted, is indicated by a graduated scale 16. The entire device is mounted upon the conveyance in a position wherein the pointer 17, when opposite the center of the graduated scale 16, is pointing in the direction of the head, and has its longitudinal dimension parallel to the fore-and-aft center line of conveyance. When the pointer is in this position the conductor 11 has, therefore, its longitudinal dimension in a position displaced ninety degrees from the fore-and-aft center line of the conveyance, and consequently, ninety degrees from the direction in which the conveyance is heading. The device is attached to the conveyance in such a manner as to permit the conductor 11 to lie in a plane substantially parallel to the earth's surface.

Let it be assumed that the conductor 11 is moving in a plane parallel to the surface of the earth and that its direction of motion is perpendicular to its greatest dimension, that is, to its length. Under such condition an electromotive force will be generated within the conductor, proportional to the rate at which it cuts the vertical component of the earth's magnetic field and a corresponding electrical potential difference will be established between the outer extremities of the conductor. It is to be understood that the direction of the motion of the conductor 11, and its velocity relative to the earth's surface, is that of the conveyance to which it is attached. Let V meters per second represent the velocity of the conveyance relative to the earth's surface in a plane parallel thereto. If H maxwell per square centimeter is the intensity of the vertical component of the earth's magnetic field; L meters the length of the conductor 11 which cuts the vertical component of the earth's magnetic field in a direction perpendicular thereto; and E millivolts the difference of electrical potential generated between the extreme ends of the conductor 11 due to the rate at which it cuts such magnetic field; then $$V = \frac{10E}{HL}$$

Care should be exercised in constructing the circuit consisting of the conductor 11, brush holders 12, brushes 13, inductance coil 26 and condenser having plates 1, to the end that the time interval during which the brushes 13 are in electrical contact with the condenser plates 1 shall be of proper duration to permit the condenser having plates 1 to be charged, at the moment when electrical contact between the brushes 13 and plates 1 is interrupted, to substantially the same electrical potential difference between its plates as that generated in the conductor 1, due to the rate at which it is cutting the vertical component of the earth's magnetic field, and which exists between the brushes 3 at the moment of such interruption. The electrical potential difference, E, between the condenser plates 1 is, therefore, of substantially equal magnitude to the electromotive-force generated in the conductor 11, but is in a direction opposing any electric current produced by such electromotive-force, at the moment when the electrical contact between the brushes 13 and plates 1 is interrupted. Remembering that the condenser plates 1 are rotating, with substantially constant angular velocity, about the center of their driving shaft 4; it may be seen that when they have rotated through an angle of substantially one hundred and eighty degrees they are again in electrical contact with the brushes 13. The difference of electrical potential, E, between the condenser plates 1 is now in a direction to assist a current produced by the electromotive force, E, generated in the manner herein-before defined, in the conductor 11. A transient electric current will, therefore, be established in the circuit consisting of the conductor 11, brush-holders 12, brushes 13, inductance coil 26 and condenser having plates 1; such current having a maximum instantaneous value proportional to a transient electromotive-force in the circuit of 2E. This current may, depending upon the magnitude of the resistance of the circuit, relative to the values of the inductance and capacitance thereof, be either oscillatory or non-oscillatory. I prefer to so proportion the constants of this circuit, as to cause the current therein to be oscillatory. I also prefer to so connect the terminals of the inductance coil 26 to the grid electrode and the cathode, respectively, of the triode electron tube 27, as to impress the maximum instantaneous potential difference existing between the terminals of the coil 26, and caused by the current therein, upon the grid electrode and cathode of the tube, in such direction as to cause the grid electrode to be positive potential with respect to the cathode at the instant of such maximum potential difference.

The rate of decay in amplitude of the electrical potential, and current, in the circuit discussed is, as is well known, established by the rate at which the energy in electrical form therein is radiated or is converted into other forms. The succeeding amplitudes of the oscillatory train are, however, functions of the initial potential amplitude, 2E. As the rate of decay, or decrement, of the circuit may be made constant, the potential variations impressed upon the grid electrode and cathode of the tube 27 are proportional to the initial potential amplitude, 2E, which in turn is proportional to the velocity, V, of the conveyance as relative to the surface of the earth.

The amplitude of the current in the inductance coil 26, and therefore the potential difference between its terminals, will become approximately zero when the condenser, having plates 1, has again become charged to the electrical potential difference, between its plates, generated by the conductor 11. The electrical contact between the brushes 13 and the plates 1 will then again be interrupted, to be re-established when the plates 1 have rotated through a further angle of approximately one hundred and eighty degrees, and the cycle of events described repeated.

The differences of electrical potential communicated to the terminals of the potential, or current, indicating instrument 24 are proportional to, but are of much greater magnitude than, the differences of potential impressed upon the grid electrode and cathode of the triode tube 27, as has been herein-before explained. As the speed of revolution of the motor 5 is approximately constant the instrument 24 may be calibrated to indicate the velocity, V, of the conveyance directly.

As E is of maximum value for any velocity, V, when the conductor 11 is perpendicular to the course of the conveyance, it becomes necessary to adjust the position of the conductor 11, as relative to the fore-and-aft center line of the conveyance, by means of the handle 22, to a position where a maximum current, or potential, is indicated by the instrument 24. The position of the pointer 17, relative to the graduated scale 16, will then indicate the course of the conveyance relative to its head or the so-called drift angle.

The intensity of the vertical component of the earth's magnetic field varies between different places upon the earth's surface, as is well known. Recourse must, therefore, be had to charts prepared by various governmental agencies with a high degree of accuracy, which show directly, or furnish sufficient information to permit the derivation of, the required value of field intensity at nearly all places upon the surface of the earth. It should be noted that in the near vicinity of the earth's magnetic equator the intensity of the vertical component of the earth's magnetic field is of insufficient magnitude for the purposes of this invention.

As a practical example of the application of this invention, let it be assumed that an air-ship, in the approximate vicinity of Seattle, Washington, United States of America, is proceeding upon a compass course of thirty degrees as indicated by a standard United States Navy mariner's compass. After correction for the variation of the compass in the given locality, and its deviation, a course of one degree is apparent. It may be found that the pointer of the instrument 24 is at its maximum deflection from the zero point of the instrument, when the pointer 17 is adjusted to a position twenty-five degrees to the left, or port, side of the center point of the graduated scale 16. The true course of the airship is then three hundred and thirty-six degrees, that is, $$[360-(25-1)]=336°$$

azimuth reading. The velocity, V, of the air-ship, relative to the ground, is directly indicated by the position of the pointer of the instrument 24, which may be calibrated to show such velocity in knots, geographical miles, or kilometers, per hour, or in any other system of units desired, provided that a value of H=0.5 (the approximate intensity in maxwells per square centimeter of the vertical component of the earth's magnetic field in the locality specified) has been used in the formula $$V=\frac{10E}{HL}$$

wherein the deflection of the pointer of the instrument 24 is a function of E. If a value of H other than 0.5 has been used in the process of calibrating the instrument 24, say H=0.3, the value of H=0.5, for the locality involved, must be ascertained from a chart, hereinbefore mentioned, and the velocity indicated by the instrument corrected by multiplying it by three and dividing the product so secured by five.

Let it be further assumed that the velocity, V, of the above example, is ten meters per second; and that the length of the conductor 11 is fifty centimeters. Then $$10=\frac{10E}{.5\times.5} \text{ and } E=.25$$

millivolts. The maximum difference of electrical potential impressed between the grid electrode and cathode of the triode tube 27 is, therefore, 2E or 0.5 millivolts.

Let it be assumed that the air-ship herein discussed, is being driven on the apparent course of one degree, herein-before mentioned, by its propeller, at a velocity of fifteen meters per second, with respect to the air. Let this velocity be represented by P. Let W represent the component velocity imparted to the air-ship, in meters per second, relative to the earth's surface, by the wind. Then $$W=\sqrt{V^2+P^2-2VP\cos 25°} \doteq \sqrt{100+225-(300\times.9063)} \doteq 7.28$$

meters per second. Let X represent the angle included between the line of corrected compass bearing of the ship's head (the apparent course of one degree) and the line of direction from which the wind is approaching. Then $$7.28 \sin X°=10 \sin 25° \doteq 4.226 \text{ and } X° \doteq 35° 30'.$$

The component, of the true course of the ship, due to the wind is, therefore, $$181+X \doteq 216° 30'.$$

It is obvious that the application of my invention not only affords a means of ascertaining the true course and velocity, with respect to the earth's surface, of aircraft as discussed in the above example; but, also, its use in conjunction with well known devices for measuring the velocity of the air-craft, with respect to the air, together with the exercise of simple mathematical processes, affords a means of resolving such true course and velocity into component courses and velocities due to forces applied to the air-craft by the wind and the action of their propellers. It may be also readily understood that the principles of my invention and the method of its use may be applied with equal facility to the science of navigation of water-craft, or of other conveyances, the true course and velocity, with respect to the surface of the earth, being thereby ascertained and, if so desired, resolved into such component courses and velocities as may be caused by disturbing forces.

The term "drift" or "drift angle" is used to designate the angle between the direction in which the conveyance is headed and the actual direction of movement of the conveyance over the earth's surface. The direction in which the conveyance is headed is easily determined by the use of a compass, and, when the drift angle is known the true course is easily determined.

It is also obvious that many modifications, or changes, may be made in the shape, kind and arrangement of the various parts without departing from the broad scope of the appended claims. It is further apparent that other types of amplifying relays may be used in place of the two stage electron tube amplifier herein shown and described. While I have shown and described a particular form and kind of apparatus, I do not desire to be limited, or restricted, in the broad scope of my invention, as described in the claims, to any specific structure of apparatus or its arrangement in elementary parts, the assemblage of which form the means of accomplishing the purposes hereinbefore stated in substantially the manner herein described.

Having set forth the nature of my invention, and a means of accomplishing the purpose thereof, what I claim as new and useful—and of my own invention, and desire to secure by Letters Patent is:—

1. The method of ascertaining the characteristics of motion of a body relative to the earth, in a plane substantially parallel to the earth's surface which consists in inducing an electromotive force proportional to the velocity at which the vertical component of the earth's magnetic field is cut by said body and deducing said characteristics of motion from said electromotive force, the bearing of the earth's poles with respect to a fixed dimension of the body being known.

2. The method of ascertaining the characteristics of motion of a body, in a plane substantially parallel to the earth's surface, relative to the earth, the bearing of the earth's poles with respect to a fixed dimension of the body being known, which consists in generating an electromotive force by cutting the vertical component of the earth's magnetic field at the velocity of the body and measuring said electromotive force.

3. The method of ascertaining the characteristics of motion of a body relative to the earth, in a plane substantially parallel to the surface of the earth, the bearing of the earth's poles with respect to a fixed dimension of the body being known, which consists in measuring the electromotive forces generated in an electrical circuit carried on said body, said forces being generated by, and proportional to the velocity of said body relative to the vertical component of the earth's magnetic field.

4. The method of ascertaining the characteristics of motion of a moving body, relative to the earth, in a plane substantially parallel to the surface of the earth, the bearing of the earth's poles with respect to a fixed dimension of the body being known, which consists in generating electromotive forces, proportional to, the rate at which the vertical component of the earth's magnetic field is cut by said moving body and utilizing said electromotive forces to indicate the velocity of movement of said body.

5. The method of ascertaining the characteristics of motion of a body in a plane substantially parallel to the surface of the earth, relative to the earth, which consists in generating electrical potential differences between points in an electrical conductor carried by said body, said electrical potential differences being, generated by, and proportional to, the velocity of said body relative to the vertical component of the earth's magnetic field, and deducing from said electrical potential differences the velocity of said body, the bearing of the earth's poles with respect to a fixed dimension of the body being known.

6. The method of ascertaining the characteristics of motion of a body in a plane substantially parallel to the surface of the earth, relative to the earth, which consists, in generating electrical potential differences between points in an electrical conductor carried by said body, said electrical potential differences being, generated by, and proportional to, the velocity of said body relative to the vertical component of the earth's magnetic field, amplifying said electrical potential differences, and using said amplified electrical potential differences to find the velocity of said body, the bearing of the earth's poles with respect to a fixed dimension of the body being known.

7. Devices for a conveyance, embodying an electrical conductor arranged on said conveyance for movement over the earth's surface in a plane substantially parallel to the earth's surface to thereby cut the vertical component of the earth's magnetic field whereby electrical potential differences will be generated between different points of said electrical conductor and means actuated by said differences of potential for determining the speed and drift of movement of said conveyance.

8. Devices of the class described for use on a conveyance, embodying an electrical conductor movable with the conveyance in such a direction as to cut the vertical component of the earth's magnetic field whereby differences of electrical potential will be generated between different points of said electrical conductor, means for adjusting said electrical conductor to find the position in which said differences of electrical potential are of maximum value and means actuated by said differences of electrical potential to cooperate with said first named means to determine the speed and drift of movement of said conveyance relative to the earth.

9. Devices arranged to be carried by a conveyance, movable relative to the earth, for indicating the movement of said conveyance, in a plane substantially parallel to the surface of the earth, embodying an electrically conductive element carried by said conveyance and arranged to cut the vertical component of the earth's magnetic field at the velocity of the conveyance whereby electromotive forces will be generated therein, and means connected with said electrically conductive element for utilizing said electromotive forces to determine the speed and drift of movement of said conveyance in said plane.

10. Devices arranged to be carried by a conveyance, movable relative to the earth, for indicating the speed and drift of said conveyance, in a plane substantially parallel to the surface of the earth, embodying an electrically conductive element arranged to cut the vertical component of the earth's magnetic field whereby electromotive forces will be generated therein, means for adjusting said electrically conductive element to find the position in which said electromotive forces are of maximum value, and indicating devices connected with said electrically conductive element and arranged to be actuated by said electromotive forces.

11. Devices arranged to be carried by a conveyance, movable relative to the earth, for indicating the speed and drift of said conveyance, in a plane substantially parallel to the surface of the earth, embodying an electrically conductive element arranged to cut the vertical component of the earth's magnetic field whereby electromotive forces will be generated therein, means for amplifying said electromotive forces, and indicating devices arranged to be actuated by said amplified electromotive forces.

12. Devices arranged to be carried by a conveyance, movable relative to the earth, for indicating the speed and drift of said conveyance in a plane substantially parallel to the surface of the earth, embodying an electrically conductive element arranged to cut the vertical component of the earth's magnetic field and to thereby have differences of electrical potential generated between different points thereof, an electrical condenser having terminals arranged to make electrical connections alternately with said different points of said electrically conductive element whereby said condenser will be alternately charged and discharged and an indicating device arranged to be actuated by the electric current produced in said electrically conductive element.

13. Devices arranged to be carried by a conveyance, movable relative to the earth, for indicating the speed and drift of said conveyance in a plane substantially parallel to the surface of the earth, embodying an electrically conductive element arranged to cut the vertical component of the earth's magnetic field and to thereby have differences of electrical potential generated between different points thereof, an electrical condenser having terminals arranged to make electrical connections alternately with said different points of said electrically conductive element whereby said condenser will be alternately charged and discharged, means for adjusting said electrically conductive element to a position in which said differences of electrical potential are of maximum value, and an indicating device arranged to be actuated by the electric current produced in said electrically conductive element.

14. Apparatus of the class described, embodying an electrically conductive element adjustably supported in a normally horizontal plane, and arranged for movement in a unipolar magnetic field, an electrical condenser, having terminals arranged to make electrical contact alternately with the extremities of said electrically conductive element, means for rotatably mounting said condenser, and indicating means governed by the electric current produced in said electrically conductive element in response to movement of the same in said unipolar magnetic field.

15. Apparatus of the class described, embodying a conveyance, an electrically conductive element, means adjustably supporting said electrically conductive element on said conveyance, said electrically conductive element being caused to cut the vertical component of the earth's magnetic field by movement of said conveyance, an electrical condenser having terminals arranged to make electrical contact alternately with the extremities of said electrically conductive element, means for rotatably mounting said condenser, means including an electron tube relay for amplifying electric current generated in said electrically conductive element, and an indicating device arranged to be operated by said amplified electric current.

16. Apparatus for determining the drift of a body in a plane substantially horizontal relative to the surface of the earth, embodying an electrical conductor carried by the body and arranged to have electrical potential differences generated between different points of the same by the movement of such body relative to the vertical component of the earth's magnetic field, means for adjusting said electrical conductor in said substantially horizontal plane to a position wherein the shortest line in said plane joining said points is substantially at right angles to the path of said body in said plane, whereby differences of potential of maximum value are obtained and means for determining the position of said conductor relative to said body when said differences of potential are of maximum value.

17. In apparatus of the class described an electrical conductor arranged for movement in a unipolar magnetic field, and means for determining differences of electrical potential generated between points in said electrical conductor, embodying an electrical condenser having terminals arranged to connect electrically with said points of said electrical conductor and then to reverse said electrical connection, and means for measuring the electric current produced in said conductor by the discharge and subsequent charge of said condenser in conjunction with the electromotive force generated in said conductor by its motion in said magnetic field.

FREDERICK GRANT SIMPSON.